United States Patent Office 3,418,072
Patented Dec. 24, 1968

3,418,072
PROCESS FOR PRODUCING ION EXCHANGERS
Jean Piret, Watermael-Boitsfort, Belgium, assignor to Societe d'Etudes, de Recherches et d'Applications pour l'Industrie S.E.R.A.I., Brussels, Belgium
No Drawing. Filed June 19, 1964, Ser. No. 376,581
Claims priority, application Austria, July 1, 1963, A 5,230/63; Great Britain, Mar. 13, 1964, 10,793/64
4 Claims. (Cl. 23—23)

ABSTRACT OF THE DISCLOSURE

A process for preparing ion exchangers in the form of crystalline grains, comprises the treatment of an acid salt of a polybasic acid selected from phosphoric, vanadic, tungstic, phosphotungstic, molybdic and phosphomolybdic and of a metal selected from titanium, zirconium, tin and niobium. A compound of the metal is heated with 98% sulphuric acid to a temperature above 120° C. and is kept at this temperature until a clear solution is obtained. The solution is cooled, and the selected anhydrous polybasic acid is added, and then the mixture is heated to 100°–200° C. until a gel is obtained, from which crystalline grains are recovered. In another embodiment, grains of the amorphous salt are mixed with an aqueous solution of sulphuric or nitric acid and of the polybasic acid from which the amorphous salt is derived, the mixture then being heated to a temperature of 50°–80° C. until crystalline grains are obtained.

---

This invention relates to a process for preparing ion exchangers in the form of crystalline grains. More particularly, the invention relates to a process for preparing crystalline grains of an acid salt of a polybasic acid selected from phosphoric, vanadic, tungstic, phosphotungstic, molybdic and phosphomolybdic acid and of a metal selected from titanium, zirconium, tin and niobium, said crystalline grains having improved ion-exchanging properties.

It has surprisingly been found that the crystalline grains prepared by the process according to the invention have ion-exchanging properties which are far better than those of amorphous or crystalline salts prepared by known processes.

According to one embodiment of the invention, these crystalline grains are obtained by a process in which a compound of a metal of the 4th and 5th groups of the Periodic Arrangement of the Elements is heated with sulphuric acid of a density of 1.84 g./cm.$^3$ (98%) at a temperature of more than 120° C. until a clear solution is obtained, an anhydrous polyacid selected from the class consisting of phosphoric, vanadic, tungstic, phosphotungstic, molybdic and phosphomolybdic acids is then added to the solution and the mixture is heated at a temperature between 100 and 200° C. until crystalline grains are precipitated, said grains being finally recovered.

It is to be noted that the process is carried out in a substantially anhydrous medium, said medium containing sulphuric acid of a density of 1.84 g./cm.$^3$, an anhydrous polyacid and a compound of a metal of the 4th or 5th group of the periodic arrangement of the elements. The use of such an anhydrous medium seems to be an important factor for obtaining crystalline grains.

The addition of a solubilizing agent, such as ammonium sulphate, to said medium is sometimes advantageous.

According to another embodiment of the invention, it is also possible to obtain crystalline grains of the above mentioned salts from the amorphous corresponding salts by a process in which an amorphous salt of a polyacid with a polyvalent cation of the 4th and 5th group of the periodic arrangement of the elements is mixed with an aqueous solution of sulphuric or nitric acid and of the polyacid from which said amorphous salt is derived and the mixture is heated at a temperature of 50 to 80° C. until crystalline grains are obtained.

The following examples are given for illustration purposes. Examples 1 to 6 describe the direct synthesis of crystalline grains by the process according to the first embodiment of the invention. Examples 7 to 10 describe the preparation of crystalline grains of ion-exchange salts from the corresponding amorphous salts by the process according to the second embodiment of the invention.

EXAMPLE 1

80 g. of zirconium oxide are mixed with 250 g. of ammonium sulphate [$(NH_4)_2SO_4$] and 1000 ml. of sulphuric acid having a density of 1.84 g./cm.$^3$ (98%). The substantially water free mixture is gradually heated to 250° C., while being stirred. A clear solution of zirconium sulphate in highly concentrated sulphuric acid is obtained. In view of the low solubility of zirconium oxide in sulphuric acid, ammonium sulphate is used, so as to form a more soluble complex with zirconium in sulphuric medium. The obtained clear solution is cooled and 250 ml. of phosphoric acid of a density of 1.70 g./cm.$^3$ (85%) is then added. The mixture is stirred and gradually heated to 170° C. within 2 hours. The obtained gel is cooled, filtered on a Buchner filter and washed with deionized water until the filtrate is no more acid, that is to say that the product is free from sulphate and ammonium ions and excess acid. Then the product is air dried. The product has the form of crystalline grains, having an average particle size of 1.5 millimeter.

EXAMPLE 2

40 g. of titanium oxide are mixed with 150 g. of ammonium sulphate and 1000 ml. of sulphuric acid having a density of 1.84 g./cm.$^3$ (98%). The substantially water free mixture is gradually heated to 180° C., while being stirred. A clear solution of titanium sulphate in highly concentrated sulphuric acid is obtained.

Ammonium sulphate is added to said medium in order to form a complex salt of titanium and ammonium, said complex salt being soluble in concentrated sulphuric acid.

The obtained clear solution is cooled and 250 ml. of phosphoric acid of a density of 1.70 g./cm.$^3$ (85%) are then added. The mixture is stirred and gradually heated to 170° C. within 2 hours. The obtained gel is then filtered on a Buchner filter and washed with deionized water until the filtrate is no more acid. Finally, the product is air dried. The product has the form of crystalline grains. Average particle size: 3–4 millimeters.

EXAMPLE 3

500 ml. of a solution of titanium tetrachloride (15%) of a density of 1.14 g./cm.$^3$ are mixed with 500 ml. of sulphuric acid of a density of 1.84 g./cm.$^3$ (98%). The mixture is heated gradually to 150° C. The heating is stopped when a clear solution is obtained. The volume is then of about 65 to 70% of the initial volume. The clear solution is cooled and 200 ml. of phosphoric acid ($d=1.70$ g./cm.$^3$; 85%) are added thereto. The mixture is made homogeneous by stirring and then gradually heated at 170° C during about 2 hours. The obtained gel is treated as in Example 1 or Example 2 to give a product similar to that of Example 2.

EXAMPLE 4

380 g. of hydrated tin chloride $SnCl_2 \cdot 2H_2O$ are mixed with 1000 ml. of sulphuric acid of a density of 1.84 g/cm.$^3$ (98%). The mixture is heated gradually to 180°

C. The heating is stopped when a clear solution is obtained. The volume is then about 75% to 80% of the initial volume. In order to oxidize $Sn^{2+}$ to $Sn^{4+}$, $Br_2$ is used and the excess of $Br_2$ is driven off by heating. The clear solution of stannic sulphate is cooled and 250 ml. of phosphoric acid (d=1.70 g./cm.$^3$; 85%) are added thereto. The mixture is made homogeneous by stirring and then gradually heated at 120° C. during about 10 minutes.

The obtained gel is treated as in Example 1 to give a product having the form of crystalline grains. Average particle size: 2 millimeters.

EXAMPLE 5

10 g. of Nb metal are mixed with 30 g. of ammonium sulphate $[NH_4)_2SO_4]$ and 160 ml. of sulphuric acid having a density of 1.84 g./cm.$^3$ (98%). The substantially water free mixture is gradually heated to 200° C. while being stirred. A clear solution of niobium sulphate in highly concentrated sulphuric acid is obtained. In order to accelerate the dissolution of niobium metal, ammonium sulphate is used.

The obtained clear solution is cooled and 52 ml. of phosphoric acid of a density of 1.70 g./cm.$^3$ (85%) are then added. The mixture is stirred and gradually heated to 150° C. within 1 hour. The obtained gel is then filtered on a Buchner filter and treated as in Example 1 or Example 2. The product has the form of crystalline grains having an average particle size of 1.5 millimeter.

EXAMPLE 6

85 ml. of a solution of stannic sulphate in sulphuric acid as in Example 4 are mixed with 50 ml. of a solution of 16% of ammonium molybdate in sulphuric acid (98%) and 150 ml. of orthophosphoric acid (1.7 g./cm.$^3$). The mixture is made homogeneous by stirring and then gradually heated at 160° C. within 1 hour. The obtained gel is treated as in Example 1 to give a product having the form of crystalline grains of stannic phosphomolybdate, having an average particle size of 4–5 millimeters.

EXAMPLE 7

100 g. of grains of amorphous titanium phosphate are mixed with 1500 ml. of orthophosphoric acid (15 N), 750 ml. of sulphuric acid (98%) and 2500 ml. of denionized water. The mixture is heated during 16 hours at a temperature of 55° C. The resulting compound is washed with denionized water in a column until the filtrate is no more acid. The obtained product is then air dried. Crystalline grains are obtained. The crystalline grains have an average particle size of 3 millimeters.

EXAMPLE 8

Crystalline grains of niobium phosphate are obtained from amorphous niobium phosphate grains as described in Example 7.

EXAMPLE 9

100 g. of grains of amorphous titanium phosphate are mixed with 1500 ml. of orthophosphoric acid (15 N), 1800 ml. of nitric acid (15 N) and 2500 ml. of deionized water. The mixture is heated during 12 hours at a temperature of 60° C. The resulting compound is washed with deionized water in a column until the filtrate is no more acid. The obtained product is then air dried.

EXAMPLE 10

100 g. of grains of amorphous stannic phosphomolybdate are mixed with 1500 ml. of sulphuric acid (98%), 100 ml. of orthophosphoric acid (85%) and 500 ml. of deionized water. The mixture is heated during 65 hours at a temperature of 65° C. The resulting compound is treated as in Example 7. Crystalline grains are obtained of an average particle size of 4 millimeters.

The procedures described in Examples 1 to 10 may be used for obtaining crystalline grains of other phosphates as well as vanadates, tungstates, molybdates, phosphotungstates and phosphomolybdates of titanium, zirconium, tin, niobium and metals of the same groups.

The ion exchange capacity of various ion-exchange crystalline salts in granules of a particle size range between 0.540 and 0.250 mm. has been tested by static and dynamic methods (F. Helfferich—Ion Exchange, McGraw-Hill, New York, 1962, pp. 91 and 493).

In the static method, 5 g. of the compound to be tested are stirred during 6 hours in the presence of copper or cobalt acetate at pH 5.6.

In the dynamic method, the testing liquid passes at constant speed through a fixed bed or column (6 x 100 mm.) containing the ion exchanging material. In this case a pH of 4.00 and a flow rate of 0.068 l./hour were chosen.

The following table shows the results for some static and dynamic tests.

TABLE

| Ion exchange crystalline salts in grain form | Exchange capacity | | |
|---|---|---|---|
| | Static test | | Dynamic test |
| | $Co^{2+}$ | $Cu^{2+}$ | |
| Zirconium phosphate: | | | |
| (a) | 0.24 | | |
| (b) | 2.7 | | |
| Titanium phosphate: | | | |
| (a) | | 0.57 | 2.07 |
| (b) | | 1.97 | 7.6 |
| (c) | | | 9.3 |
| Niobium phosphate: | | | |
| (a) | | 1.00 | |
| (b) | | 1.50 | |
| Tin phosphomolybdate: | | | |
| (a) | | | 2.25 |
| (b) | | | 4.18 |
| Titanium phosphotungstate: | | | |
| (a) | | | 3.00 |
| (b) | | | 3.50 |

In this table, (a) means that the salt is amorphous, (b) means that the salt is a crystalline and granular salt which has been prepared from an amorphous salt by the process described in Examples 7, 8, 9 and 10, and (c) means that the salt is in the form of crystalline grains which have been prepared by direct or one step synthesis as described in Examples 1 to 6.

This table shows clearly that the ion exchange characteristics of the crystalline grains according to this invention are very much improved with respect to amorphous samples.

The fact that the salts obtained by the process according to this invention are crystalline has been confirmed by many tests as briefly indicated hereafter:

Chemical analysis (X-ray fluorescence) shows that the phosphorus to titanium atom ratio (for titanium phosphate) is the same for improved (crystalline grains) and usual (amorphous) compounds;

X-ray diagrams (diffraction) show that the usual substance (Zr, Sn and Ti phosphates, phosphomolybdate, phosphotungstate) is almost completely amorphous, whereas the improved materials (crystalline grains) do show a definite degree of crystallization (presence of very strong lines in the diagrams);

For titanium phosphate thermo-differential analysis curves show a peak at about 120° C. This peak corresponds most probably to the presence of water of crystallization. The peak of the usual amorphous substance is very diffuse while the peak of the diagram of the improved substances (crystalline grains) is very sharp. These peaks again imply a high degree of crystallization for the improved substance.

What is claimed is:

1. A process for preparing crystalline grains of an acid salt of a polybasic acid selected from the class consisting of phosphoric, vanadic, tungstic, phosphotungstic, molybdic and phosphomolybdic and a metal selected from the class consisting of titanium, zirconium, tin and niobium, comprising heating a compound of the selected metal in a sulfuric acid soluble form with sulphuric acid of a density of about 1.84 gram/cm.³ to a temperature above 120° C. until a clear solution is obtained, cooling said solution, adding to the solution the selected polybasic acid in substantially anhydrous form, heating the resulting mixture to a temperature between 100° and 200° C. until a gel is obtained, and drying said gel to produce crystalline grains.

2. A process as claimed in claim 1, and adding a solubilizing agent to the sulphuric acid.

3. A process as claimed in claim 2, in which the solubilizing agent is ammonium sulphate.

4. A process for preparing crystalline grains of an acid salt of a polybasic acid selected from the class consisting of phosphoric, vanadic, tungstic, phosphotungstic, molybdic and phosphomolybdic and of a metal selected from the class consisting of titanium, zirconium, tin and niobium, comprising mixing grains of an amorphous salt of the selected polybasic acid and the selected metal with an aqueous solution of the polybasic acid from which said amorphous salt is derived and an acid selected from the class consisting of sulphuric and nitric, heating the mixture to a temperature of 50° to 80° C. until crystalline grains are obtained, and then separating the crystalline grains from the rest of the mixture.

References Cited

UNITED STATES PATENTS

| | | | |
|---|---|---|---|
| 2,859,093 | 11/1958 | Russell et al. | 23—50 |
| 2,970,035 | 1/1961 | Stroughton | 23—50 |
| 3,056,647 | 10/1962 | Amphlett | 23—51 X |

OSCAR R. VERTIZ, *Primary Examiner.*

HERBERT T. CARTER, *Assistant Examiner.*

U.S. Cl. X.R.

23—51, 105